United States Patent [19]

Rains et al.

[11] Patent Number: 5,391,344
[45] Date of Patent: Feb. 21, 1995

[54] PRODUCTION OF CLASS A SURFACE OF FIBER REINFORCED POLYURETHANE MOLDED PRODUCTS

[75] Inventors: Randall C. Rains, Pittsburgh; Kristen L. Parks, Wexford, both of Pa.

[73] Assignee: Miles Inc., Pittsburgh, Pa.

[21] Appl. No.: 159,891

[22] Filed: Dec. 1, 1993

Related U.S. Application Data

[63] Continuation-in-part of Ser. No. 798,479, Nov. 26, 1991, abandoned.

[51] Int. Cl.⁶ ............................................. B29C 45/14
[52] U.S. Cl. .................... 264/257; 264/258; 264/328.2; 264/328.6; 264/240; 264/331.19
[58] Field of Search ............ 264/257, 250, 240, 328.1, 264/328.2, 328.6, 300, 331.19

[56] References Cited

U.S. PATENT DOCUMENTS

| | | | |
|---|---|---|---|
| 4,218,543 | 8/1980 | Weber et al. | 521/51 |
| 4,385,955 | 5/1983 | Doerfling et al. | 264/257 |
| 4,435,349 | 3/1984 | Dominquez et al. | 264/257 |
| 4,610,835 | 9/1986 | Ghavamikia | 264/250 |
| 4,664,862 | 5/1987 | Ghavamikia | 264/257 |
| 4,714,575 | 12/1987 | Preston | 264/257 |
| 4,781,876 | 11/1988 | Kia | 264/261 |
| 4,792,576 | 12/1988 | Nodelman | 521/174 |
| 4,810,444 | 3/1989 | Alberino et al. | 264/102 |
| 4,838,974 | 6/1989 | Nied et al. | 264/257 |
| 4,871,789 | 10/1989 | Martinez | 523/220 |
| 4,891,176 | 1/1990 | Drysdale et al. | 264/257 |
| 4,948,661 | 8/1990 | Smith et al. | 264/258 |
| 4,952,358 | 8/1990 | Okina et al. | 264/134 |
| 4,957,684 | 9/1990 | Kia | 264/257 |
| 5,009,821 | 4/1991 | Weaver | 264/22 |
| 5,034,173 | 7/1991 | Altman et al. | 264/257 |
| 5,071,608 | 12/1991 | Smith et al. | 264/257 |
| 5,071,939 | 12/1991 | Fukami et al. | 264/257 |
| 5,130,071 | 7/1992 | Iseler et al. | 264/258 |

*Primary Examiner*—Mathieu D. Vargot
*Attorney, Agent, or Firm*—Joseph C. Gil; N. Denise Brown

[57] ABSTRACT

The invention is directed to a process for preparing a Class-A surface, fiber reinforced molded article. The process broadly requires the use of a polished mold and two separate fiber surfacing veils with a fiber reinforcement sandwiched therebetween. A polyurethane reaction system is injected into the mold.

8 Claims, No Drawings

PRODUCTION OF CLASS A SURFACE OF FIBER REINFORCED POLYURETHANE MOLDED PRODUCTS

CROSS-REFERENCE TO RELATED APPLICATION

This application is a continuation-in-part of U.S. application Ser. No. 07/798,479, filed on Nov. 26, 1991, now abandoned.

BACKGROUND OF THE INVENTION

Reaction injection molding (RIM) has become an important process for the manufacture of a wide variety of moldings. The RIM process is a process which involves the intimate mixing of a polyisocyanate component and an isocyanate-reactive component followed by the injection (generally under high pressure) of the mixture into a mold with subsequent rapid curing. The polyisocyanate component is generally a liquid isocyanate. The isocyanate-reactive component generally contains a high molecular weight isocyanate reactive component (generally a polyol), and usually contains a chain extender or crosslinker containing amine or hydroxyl groups. U.S. Pat. No. 4,218,543 describes one particular commercially significant RIM system, which requires the use of a specific type of aromatic amine as a crosslinker/chain extender. The preferred amine described in the '543 patent is diethyl toluene diamine (DETDA). Formulations based on DETDA are generally restricted to the lower flexural modulus range (i.e., less than about 70,000 psi at room temperature). While it is known to use DETDA in combination with other co-chain extenders in order to increase the flexural modulus of the resultant molding, the use of such co-chain extenders generally adversely affect the thermal properties of the resultant part.

In the automotive industry, the application of RIM technology has been primarily to produce vertical parts (e.g. fenders and fascias) and has typically not been used in the production of horizontal body parts (e.g., trunks, hoods and roofs). In order to be useful for the production of horizontal body parts, the molded product 1) must have high stiffness, 2) must have a high quality surface, and 3) must be able to withstand the heat generated during further processing of the part (e.g., painting and curing the paint). Typically, such a part must have a flexural modulus of 750,000 psi or higher.

Fiber glass reinforcement of polyurethane RIM parts is known. See, e.g., U.S. Pat. Nos. 4,435,349, 4,792,576, and 4,871,789. When utilizing such fiber glass reinforcement, several problems are generally encountered, not the least of which is the production of a smooth surface (see, e.g., U.S. Pat. Nos. 4,610,835, 4,644,862, 4,781,876, 4,810,444, 4,952,358, 4,957,684, and 5,009,821).

Other problems seen in using such mats in the RIM process include displacement of the mat in the mold, incomplete filling of the mold, and part distortion. It is believed that these problems are caused in part by the RIM reactants reaching a high viscosity in too short a time to completely impregnate the mat. One solution to this problem was described in U.S. Pat. No. 4,435,349. The '349 patent describes the use of a reaction mixture of a polyisocyanate, a polyol having an equivalent weight above 500, a relatively low molecular weight chain extender (such as ethylene glycol), and a delayed action catalyst. In all the examples of the '349 patent, an excess of polyol was used which had an equivalent weight in excess of 1800 and a molecular weight of no less than about 5500. The '349 patent also describes the use of a surfacing veil (note Example II) to improve surface appearance. The surface veil is used in an amount of 1 ounce per square yard (0.034 kg/m$^2$).

DESCRIPTION OF THE INVENTION

The present invention is directed to a process for preparing a Class A surface, fiber reinforced molded article. The process can be used to produce horizontal, as well as vertical, automotive parts. The process comprises:

(A) providing a mold, including at least two cooperating mold sections, having a cavity therein for forming the fiber reinforced molded article, wherein at least a portion of the mold cavity defines a mold cavity surface, said surface having an SPI-SPE polished rating of at least 3, and against which surface the article is to be molded, (B) laying one or more fiber, and preferably glass fiber, surfacing veils against said mold cavity surface in an amount of at least 0.1 kilogram per square meter, (C) laying one or more layers of fiber reinforcing mat over said surfacing veil, said mat being used in an amount of at least 0.5, and preferably at least 1.0, kilograms per square meter, (D) laying one or more fiber, and preferably glass fiber, surfacing veils over said fiber mat in an amount substantially the same as the amount of surfacing veil laid over said mold cavity surface, the total amount of said surfacing veils and said mat being such that the total amount of fiber in said molded article is from 15 to 45% by weight, and preferably from 20 to 35% by weight, based upon the total weight of the molded product, (E) closing the mold, (F) injecting a reaction mixture into said mold cavity, wherein the reaction mixture fills the mold cavity and simultaneously impregnates said mat and deforms said veil into intimate contact with said mold cavity surface, said reaction mixture comprising one or more polymethylene poly(phenyl isocyanates) (1) having a diisocyanate content of from 25 to less than 50% by weight, (2) containing less than 2% by weight of 2,4'-methylene bis(phenyl isocyanate), and (3) containing less than 0.5% by weight of 2,2'-methylene bis(phenyl isocyanate), and a polyol blend comprising: (i) at least one polyether polyol having an hydroxyl functionality of from 2 to 8 and a molecular weight of from 350 to below 1800, (ii) at least one hydroxyl functional organic material containing from 2 to 8 hydroxyl groups and having a molecular weight below 350, components (i) and (ii) being used in a weight ratio of from about 10:1 to about 1:10, and (iii) no more than 45% by weight based on the total weight of components (i), (ii), and (iii), of one or more active hydrogen containing compounds having a molecular weight of 1800 or more, said reaction mixture being processed as a one shot system by the RIM process at an isocyanate index of from about 70 to about 130, (G) allowing the reaction mixture to fully react, and removing the resultant molded product from the mold.

In general, the final thickness of the molded part is no thicker than 120 thousandths of an inch. The surface of the part is a Class A surface, and the flexural modulus of the part is in excess of about 5.16 GPa (i.e., in excess of about 750,000 psi). Finally, the part is able to withstand heat over a broad range of temperatures up to 100° C.

The polyurethane systems useful herein are known and are described in U.S. Pat. No. 4,792,576, the disclosure of which is herein incorporated by reference.

Starting polyisocyanate components suitable for use in the present invention are polymethylene poly(phenyl isocyanates) (1) having a diisocyanate content of from 25 to less than 50% by weight, (2) containing less than 2% by weight of 2,4'-methylene bis(phenyl isocyanate), and (3) containing less than 0.5% by weight of 2,2'-methylene bis(phenyl isocyanate). The isocyanates generally have isocyanate group contents of from 25 to 35% by weight, and preferably from 27 to 32% by weight.

The polyol blend used according to the present invention must include i) a polyether polyol having a molecular weight of from 350 to below 1800 and ii) a polyhydroxy material having a molecular weight below 350, and may include iii) up to 45% by weight of one or more active hydrogen containing compounds having molecular weights of more than 1800 and having functionalities of 2 to 8.

Polyethers having molecular weights of from 350 to below 1800 containing two to four hydroxy groups are preferred as component i). Useful polyethers are known and are obtained, for example, by the polymerization of epoxides, such as ethylene oxide, propylene oxide, butylene oxide, tetrahydrofuran, styrene oxide or epichlorohydrin alone, for example in the presence of $BF_3$, or by the chemical addition of these epoxides, optionally in admixture with or in succession to starter components having reactive hydrogen atoms. Such starter compounds include water, alcohols, or amines, such as ethylene glycol, 1,3- or 1,2-propylene glycol, trimethylol propane glycerine, 4,4'-dihydroxy diphenyl propane, aniline, ammonia, ethanolamine and ethylene diamine.

Compounds containing at least two hydroxyl groups and having molecular weights of below 350 are also used in the present invention. These materials preferably contain 2 or 3 hydroxyl groups. Mixtures of different compounds containing at least two hydroxyl groups and having molecular weight of less than 350 may also be used. Examples of such low molecular weight compounds are ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bishydroxymethyl cyclohexane, 2-methyl, 3-propane diol, dibromobutene diol (U.S. Pat. No. 3,723,392), glycerol, trimethylol propane, 1,2,6-hexane triol, trimethylol ethane, pentaerythritol, quinitol, mannitol, sorbitol, diethylene glycol, triethylene glycol, tetraethylene glycol, higher polyethylene glycols having molecular weights of less than 350, dipropylene glycol, higher polypropylene glycols having molecular weights of less than 350, dibutylene glycol, higher polybutylene glycols having a molecular weight of less than 400, 4,4'-dihydroxy diphenyl propane, dihydroxy methyl hydroquinone, and the like.

Other low molecular weight polyols having a molecular weight of less than 350 which may be used in accordance with the present invention include ester diols, diol urethanes and diol ureas of the type described in U.S. Pat. No. 4,972,576.

For certain purposes, it may be advantageous to use polyols containing sulfonate and/or phosphonate groups (German Offenlegungsschrift No. 2,719,372), such as the adduct of bisulfite with 1,4-butene diol or the alkoxylation product thereof.

The higher molecular weight, isocyanate reactive materials useful herein are known in the polyurethane art and include hydroxyl containing materials as well as amine functional materials. Preferred are relatively high molecular weight polyethers having molecular weights of above 1800 and having hydroxyl functionalities of from 2 to 4.

The fiber surfacing veils useful herein are generally commercially available. As is known, surfacing veils (or mats) are generally highly filamentized polyester or fiberglass, used primarily to produce a smooth surface on a reinforced plastic laminate. Polyester fiber surfacing veils are generally not preferred since they tend to be more expensive than fiberglass veils and since they tend to shift during molding. Accordingly, it is preferred to use glass fiber surfacing veils. Suitable commercial glass fiber surfacing veils include Surmat SF 100, available from Nicofibers, Schmelzer Industries veil, available from GLS Fiberglass and Viledon glass veils, available from Freudenberg. It is essential that the surfacing veil be used in an amount of at least 0.1 kilogram per square meter. Depending upon the weight of the particular veil chosen, more than one sheet of veil may have to be used in order to reach the required weight. The upper limit is generally set by economic considerations. The surfacing veil should be placed on the mold surface and substantially the same amount should be placed on the reinforcing mat. It is most preferred that exactly the same weight of veil be placed on the mold surface and on the reinforcing mat, since if substantially different weights are used, part warpage may result.

The reinforcing mats useful in this invention comprise glass mats, graphite mats, polyester mats, polyaramide mats such as KEVLAR mats and mats made from any fibrous material. The preferred glass mats are continuous glass strand mats of the type generally used in producing reinforced RIM parts. Typical useful mats are described in the examples set forth in U.S. Pat. No. 4,792,576. Although the mats used in the examples of the present invention are random continuous strand mats made of glass fiber bundles, woven mats and oriented mats such as uniaxial or triaxial mats may also be used. Depending upon the weight of the particular reinforcing mat chosen, more than one sheet of mat may have to be used in order to reach the required weight.

Catalysts may also be used in the invention. Suitable catalysts include those known per se, for example tertiary amines such as triethylamine, tributylamine, N-methylmorpholine, N-ethylmorpholine, N-cocomorpholine, N,N,N',N'-tetramethyl-ethylene diamine, 1,4-diazabicyclo-(2,2,2)-octane, N-methyl-N'-dimethylaminoethyl piperazine, N,N-dimethylbenzylamine, bis-(N,N-diethylaminoethyl)adipate, N,N-diethylbenzylamine, pentamethyldiethylene triamine, N,N-dimethyl-cyclohexylamine, N,N,N',N'-tetramethyl-1,3-butane diamine, N,N-dimethyl-$\beta$-phenylethylamine, 1,2-dimethylimidazole and 2-methylimidazole.

Examples of tertiary amines containing hydrogen atoms capable of reacting with isocyanate groups are triethanolamine, triisopropanolamine, N-methyldiethanolamine, N-ethyldiethanolamine, N,N-dimethylethanolamine and their reaction products with alkylene oxides, such as propylene oxide and/or ethylene oxide.

Other suitable catalysts are silaamines having carbon silicon bonds of the kind described in German Patent Number 1,229,290. These include 2,2,4-trimethyl-2-silamorpholine and 1,3-diethylaminomethyl tetramethyl disiloxane.

Nitrogen-containing bases such as tetraalkyl ammonium hydroxides; alkali hydroxides such as sodium hydroxide; alkali phenolates such as sodium phenolate; alkali alcoholates such as sodium methylate, and hexahydrotriazines may also be used as catalysts.

Organometallic compounds especially organotin compounds may also be used as catalysts. Preferred organotin compounds include tin-(II)-salts of carboxylic acids, such as tin-(II)-acetate, tin-(II)-octoate, tin-(II)-ethylhexoate and tin-(II)-laurate and the dialkyl tin salts of carboxylic acids such as dibutyl tin diacetate, dibutyl tin dilaurate, dibutyl tin maleate or dioctyl tin diacetate.

Further examples of suitable catalysts and details on the way in which the catalysts work can be found in Kunststoff-Handbuch, Vol. VII, published by Vieweg and Hochtlen, Carl-Hanser-Verlag, Munich 1966 page 96–102.

The catalysts are generally used in quantities of from about 0.001 to 10% by weight, based on the quantity of isocyanate reactive compounds.

Surface-active additives can also be used. Examples of emulsifiers are the sodium salts of castor oil sulphonates or even of fatty acids or salts of fatty acids with amines such as diethylamine oleate or diethanolamine stearate. Alkali or ammonium salts of sulphonic acids, such as those of dodecylbenzene sulphonic acid or dinaphthylmethane disulphonic acid or even of fatty acids, such as ricinoleic acid, or of polymeric fatty acids, can also be used as surface-active additives.

It is also possible to use reaction retarders, for example, substances with an acid reaction such as hydrochloric acid or organic acid halides. Pigments or dyes and flameproofing agents known per se, such as tris-chloroethyl phosphate or ammonium phosphate and polyphosphate and Mobil's Antiblaze 19 flame retardant may be used. Stabilizers against the effects of aging and weather, plasticizers and substances with fungistatic and bacteriostatic effects, fillers such as barium sulphate, kieselguhr, carbon black or prepared chalk may also be used.

It is also preferred that so-called external and/or internal mold release agents be used. Suitable internal mold release agents include those described in U.S. Pat. Nos. 4,585,803, 4,581,386 and 4,519,965, the disclosures of which are herein incorporated by reference. Also useful are those internal mold release agents described in German Offenlegungsschriften 1,953,637 and 2,121,670. One particularly preferred mold release is a mixture of Silicone DC-193 (available from Dow Corning) and the adduct formed by reacting one mole of N,N'-dimethylpropylamine with two moles of tall oil.

The invention is further illustrated but is not intended to be limited by the following examples in which all parts and percentages are by weight unless otherwise specified.

EXAMPLES 1 THROUGH 10

The mold used was a Fiero hood outer tool, having an SPI-SPE polished rating of between 1 and 2 (as is known in the art, the lower the number, the more highly polished is the mold, with a rating of 1 and 2 being more polished than a rating of 3), and used to manufacture SMC parts. The 1.9 square meter mold was converted for reaction injection molding ("RIM") by installing a center-gated injection port, removing excess SMC heating lines, and cutting vents into the regions of the mold where air could be entrapped. During molding, the mold temperature was about 82° C.

The Fiero hood mold was installed on a production scale Cannon 600 ton press with 2.4 meter by 3.0 meter platens. The mold was installed so that the Class-A surface was placed on the cavity side or lower half and the bonding or no-show surface was placed on the core side or upper half of the mold. A Hennecke HS-3000 metering unit with an approximate throughput range of 0.5 to 3.6 kg/sec. and a maximum shot size of 25 kg was used to inject the polyol and isocyanate.

The types of reinforcement mats used were continuous glass fiber strand mats (Owens-Corning Fiberglass M8610 or Certainteed U814 or U812). One sheet of fine glass fiber (17 micron) surfacing veil (Nicofiber Surmat SF-100 or Schmelzer) was placed on the Class-A surface and one sheet of a veil of the same type and weight was placed on top of the continuous strand mat.

The glass mats were rough-cut by hand and then final cut using the shear edge on the mold. Typical throughputs for the Fiero hood outer were 0.5 kg/sec. This allowed a shot time of about 11 seconds. Reaction was complete for this part in about 90 seconds. As the chemicals were being injected, the mold was first approximately 3 mm open, and was brought fully closed upon completion of the shot. This is done to lessen air entrapment at the extremities of the part. The chemicals were kept at 35° C. prior to injecting. The actual in-mold pressures at the glass loadings examined were approximately 1.7 MPa.s. The mixing pressures were about 8.3 MPa.s for the polyol side and about 6.9 MPa.s for the isocyanate side, while the injection pressures at the end of the shot were about 13.8 MPa.s on the polyol side and 12.4 MPa.s on the isocyanate side. External mold releases were applied to the mold surface to aid release.

The resultant full size Fiero hoods were painted at several autobody refinishing shops. ½ mil primer (a grey two component primer sold by Akzo Coatings, Inc., having the product code: 11BLU-42996) and ¾ mil of a glossy black urethane basecoat (sold by Akzo Coatings, Inc., having the product code 4BHU43741) were applied to the hoods. To insure that surface defects were not masked by painting, these refinishing shops did not attempt to sand or otherwise modify the actual part surfaces in any way. The samples were measured for distinctness of image (DOI) using a Hunter Dorigon digital DOI Goniophotometer.

Physical properties were obtained from plaques cut from flat portions of the SRIM Fiero hoods. Samples were tested for flexural modulus (ASTM D-790), density (ASTM D-792), and heat distortion (ASTM D-648). The weight glass was determined by burning off the resin from a sample of the final molded composite.

The following materials were used in the examples:
1) POLYOL BLEND A: a mixture of i) 50 parts by weight of a polyoxypropylene diol adduct having a molecular weight of about 425, ii) 30 parts by weight of ethylene glycol, and iii) 20 parts by weight of a 356 molecular weight adduct of ethylene diamine and propylene oxide.
2) POLYOL BLEND B: a mixture of i) 20 parts by weight of a 6011 molecular weight glycerine/propylene oxide/ethylene oxide (propylene oxide to ethylene oxide weight ratio of about 5:1) adduct having a primary hydroxyl content of about 88%, ii) 40 parts by weight of a polyoxypropylene diol adduct having a molecular weight of about 425, iii) 24 parts by weight of ethylene glycol, and iv) 16 parts by weight of a 356 molecular weight adduct of ethylene diamine and propylene oxide.

3) POLYOL BLEND C: a mixture of i) 30 parts by weight of a 2805 molecular weight glycerine/propylene oxide/ethylene oxide (propylene oxide to ethylene oxide weight ratio of about 5:1) adduct having a primary hydroxyl content of about 73%, ii) 20 parts by weight of a 160 molecular weight adduct of glycerine and propylene oxide, iii) 5 parts by weight of ethylene glycol, and iv) 50 parts by weight of a 356 molecular weight adduct of ethylene diamine and propylene oxide.

4) CAT A: triethylenediamine, sold as Dabco 33LV by Air Products.

5) CAT B: SA 610-50, available from Air Products. 1,5-diazabicyclo[5.4.0]undec-5-ene.

6) CAT C: Topcat 190, a tetra(alkylthio)tin compound available from Tylo Industries.

7) ISO A: a polymethylene poly(phenyl isocyanate), having a diisocyanate content of 44% by weight, containing 1.6% by weight of 2,4'-methylene bis(phenyl isocyanate) and 42.4% by weight of, 4,4'-methylene bis(phenyl isocyanate). The isocyanate has an isocyanate group content of 32% by weight and a viscosity at 25° C. of 180 mPa.s.

8) ISO B: a polymethylene poly(phenyl isocyanate), having a diisocyanate content of 40% by weight, containing 1.8% by weight of 2,4'-methylene bis(phenyl isocyanate), and 38.2% by weight of 4,4'-methylene bis(phenyl isocyanate). The isocyanate has an isocyanate group content of 27% by weight and a viscosity at 25° C. of 350 mPa.s.

9) M8610: a continuous strand fiberglass mat available from Owens Corning Fiberglass. The mats are available in a variety of weights per square foot.

10) CTU812: a continuous strand fiberglass mat available from Certainteed having 2% by weight binder, and available in a variety of weights.

11) CTU814: a continuous strand fiberglass mat available from Certainteed having 4% by weight binder, and available in a variety of weights.

12) SCH: a surfacing veil available from Schmelzer Industries, and available in a variety of weights.

13) SF100: a surfacing veil available from Nicofibers, and available in a variety of weights.

14) MOLD RELEASE A: CT-2006: a naphtha based wax emulsion commercially available from Chemtrend.

15) MOLD RELEASE B: Airlift 1274: a water based wax emulsion commercially available from Air Products.

16) MOLD RELEASE C: CT-2009: a naphtha based wax emulsion commercially available from Chemtrend.

The various formulations and materials were as set forth in Table 1. The catalyst noted was mixed with the polyol blend noted in an amount dependent upon the particular catalyst. CAT A was added in the amount of 1.0 parts by weight per 100 parts of polyol blend, CAT B was added in the amount of 0.5 parts by weight per 100 pads of polyol blend and CAT C was added in the amount of 0.5 parts by weight per 100 parts of polyol blend. The weight ratios of isocyanate to polyol blend (where the blend included the catalyst were as follows:

Examples 1 through 8: 193:100
Example 9: 156:100
Example 10: 183:100.

MOLD RELEASE A was used in Examples 2, 3, and 7 through 10; MOLD RELEASE B was used in Examples 1, 5 and 6; and, MOLD RELEASE C was used in Example 4. The results obtained were as set forth in Table 2.

TABLE 1

| Example | Polyol | Isocyanate | Catalyst | Surface Veil | Reinforcement |
|---|---|---|---|---|---|
| 1 | BLEND A | ISO A | A and B | 0.1 kg/m² SCH | 0.5 kg/m², M8610, 2 sheets |
| 2 | BLEND A | ISO A | A and B | 0.1 kg/m² SCH | 0.6 kg/m², M8610, 2 sheets |
| 3 | BLEND A | ISO A | A and B | 0.1 kg/m² SCH | 0.5 kg/m², CTU812, 2 sheets |
| 4 | BLEND A | ISO A | A and B | 0.1 kg/m² SCH | 0.5 kg/m², M8610, 2 sheets |
| 5 | BLEND A | ISO A | A and B | 0.1 kg/m² SF100 | 0.5 kg/m², M8610, 2 sheets |
| 6 | BLEND A | ISO A | A and B | 0.1 kg/m² SF100 | 0.5 kg/m², M8610, 2 sheets |
| 7 | BLEND A | ISO A | A and B | 0.1 kg/m² SCH | 0.5 kg/m², M8610, 1 sheet |
| 8 | BLEND A | ISO A | A and B | 0.1 kg/m² SCH | 0.5 kg/m², CTU814, 1 sheet |
| 9 | BLEND B | ISO A | A and B | 0.1 kg/m² SF100 | 0.3 kg/m², M8610, 2 sheets |
| 10 | BLEND C | ISO B | A and C | 0.1 kg/m² SF100 | 0.3 kg/m², M8610, 2 sheets |

TABLE 2

| Example | Total Weight % Glass | Flex Mod., GPa. | Density, g/cm³ | Heat dist. Temp., °C. | Panel Thickness mm | DOI |
|---|---|---|---|---|---|---|
| 1 | 26.7 | 6.92 | 1.43 | 213 | 3.0 | 90 |
| 2 | 30.4 | 7.58 | 1.51 | 206 | 3.0 | 90 |
| 3 | 23.6 | 5.76 | 1.41 | 178 | 3.0 | 90 |
| 4 | 32.7 | 7.29 | 1.46 | 213 | 2.3 | 90 |
| 5 | 29.3 | 6.92 | 1.45 | 212 | 3.0 | 90 |
| 6 | 31.9 | 9.27 | 1.48 | 214 | 2.3 | 90 |
| 7 | 21.7 | 6.71 | 1.38 | 116 | 2.0 | 90 |
| 8 | 20.4 | 6.09 | 1.40 | 118 | 2.03 | 90 |
| 9 | 20.0 | 5.41 | 1.34 | 188 | 3.0 | 90 |
| 10 | 19.9 | 5.16 | 1.35 | 167 | 3.0 | 90 |

EXAMPLES 11 THROUGH 14

These experiments were undertaken to prove the criticality of the amount of surfacing veil necessary to obtain a Class-A surface.

A polyol component was prepared from 100 parts by weight of POLYOL BLEND A, 1.0 part of CAT A, and 0.5 parts of CAT B. The isocyanate used was ISO A.

The mold used was a 61.595 cm×74.93cm×0.3175 cm (24.25 inches×29.5 inches×0.125 inches) polished steel metal mold, having an SPI-SPE polished rating of 3. The mold was treated with MOLD RELEASE A and was installed on a Cannon 600 ton press with 2.4 meter by 3.0 meter platens. A Hennecke HS-3000 metering unit with a throughput of 0.45 kg/sec was used to inject the polyol component and the isocyanate. The amount of surfacing veil noted in Table 3 under the heading "Weight A" was placed in the mold, 0.92 kg/m² of Owens-Corning Fiberglass 8610 was placed on top of the first surfacing veil, and the amount of surfacing veil noted in Table 3 under the heading "Weight B" was placed on top of the continuous strand mat. The isocyanate index was 105, which corresponded to a weight ratio of isocyanate to polyol component of 195.2:100. The mixing pressures were about 9.65 MPa.s for the isocyanate and about 11.0 MPa.s for the polyol component. Both components were at about 32° C. The mold temperature was about 82° C., and the demold time was 3 minutes. The unpainted DOI for each part was then measured and were as reported in Table 3. Examples 11 and 12 are comparative examples.

TABLE 3

| Example | Weight A, kg/m2 | Weight B kg/m² | DOI |
|---|---|---|---|
| 11 | 0.034 | 0.034 | 60 |
| 12 | 0.068 | 0.068 | 60 |
| 13 | 0.102 | 0.102 | 80 |
| 14 | 0.136 | 0.136 | 80 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a Class A surface, fiber reinforced molded article comprising:
    (A) providing a mold, including at least two cooperating mold sections, having a cavity therein for forming the fiber reinforced molded article, wherein at least a portion of the mold cavity defines a mold cavity surface, said surface having an SPI-SPE polished rating of at least 3, and against which surface the article is to be molded,
    (B) laying one or more fiber surfacing veils against said mold cavity surface in an amount of at least 0.1 kilogram per square meter,
    (C) laying one or more layers of a reinforcing fiber mat over said surfacing veil, said mat being used in an amount of at least 0.5 kilograms per square meter,
    (D) laying one or more fiber surfacing veils over said fiber mat in an amount substantially the same as the amount of surfacing veil laid over said mold cavity surface, the total amount of said surfacing veils and said mat being such that the total amount of fiber in said molded article is from 15 to 45% by weight based upon the total weight of the molded product,
    (E) closing the mold,
    (F) injecting a reaction mixture into said mold cavity, wherein the reaction mixture fills the mold cavity and simultaneously impregnates said mat and deforms said veil into intimate contact with said mold cavity surface, said reaction mixture comprising one or more polymethylene poly(phenyl isocyanates) (1) having a diisocyanate content of from 25 to less than 50% by weight, (2) containing less than 2% by weight of 2,4'-methylene bis(phenyl isocyanate), and (3) containing less than 0.5% by weight of 2,2'-methylene bis(phenyl isocyanate), and a polyol blend comprising: (i) at least one polyether polyol having an hydroxyl functionality of from 2 to 8 and a molecular weight of from 350 to below 1800, (ii) at least one hydroxyl functional organic material containing from 2 to 8 hydroxyl groups and having a molecular weight below 350, components (i) and (ii) being used in a weight ratio of from about 10:1 to about 1:10, and (iii) no more than 45% by weight based on the total weight of components (i), (ii), and (iii), of one or more active hydrogen containing compounds having a molecular weight of 1800 or more, said reaction mixture being processed as a one shot system by the RIM process at an isocyanate index of from about 70 to about 130,
    (G) allowing the reaction mixture to fully react, and removing the resultant molded product from the mold.

2. The process of claim 1, wherein said surfacing veils are glass fiber surfacing veils.

3. The process of claim 1, wherein said reinforcing mat is a continuous strand glass fiber mat.

4. The process of claim 1, wherein said reinforcing mat is used in an amount of at least 1.0 kilogram per square meter.

5. The process of claim 1, wherein the amount of said veils and said reinforcing mat is such that the total fiber content is from 20 to 35% by weight.

6. The process of claim 1, wherein the isocyanate group content of said polymethylene poly(phenyl isocyanate) is from 25 to 35% by weight.

7. The process of claim 6, wherein the isocyanate group content of said polymethylene poly(phenyl isocyanate) is from 27 to 32% by weight.

8. The process of claim 1, wherein said surfacing veils are glass fiber surfacing veils, said reinforcing mat is a continuous strand glass fiber mat and is used in an amount of at least 1.0 kilogram per square meter, and the amount of said veils and said reinforcing mat is such that the total fiber content is from 20 to 35% by weight.

* * * * *